United States Patent
Cooke et al.

(10) Patent No.: US 7,088,893 B2
(45) Date of Patent: Aug. 8, 2006

(54) PRE-CONNECTORIZED FIBER OPTIC DISTRIBUTION CABLE HAVING MULTIFIBER CONNECTOR

(75) Inventors: Terry L. Cooke, Hickory, NC (US); Robert B. Elkins, II, Hickory, NC (US); John B. Johnson, Hickory, NC (US); Dennis M. Knecht, Hickory, NC (US); James P. Luther, Hickory, NC (US); Lars K. Nielsen, Denver, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/964,473

(22) Filed: Oct. 13, 2004

(65) Prior Publication Data

US 2005/0111800 A1    May 26, 2005

Related U.S. Application Data

(63) Continuation-in-part of application No. 10/724,244, filed on Nov. 26, 2003, now abandoned, and a continuation-in-part of application No. 10/736,394, filed on Dec. 15, 2003, now Pat. No. 7,006,739.

(51) Int. Cl.
*G02B 6/44* (2006.01)
(52) U.S. Cl. .................................. 385/100; 385/115
(58) Field of Classification Search ........... 385/100, 385/115
See application file for complete search history.

(56) References Cited

U.S. PATENT DOCUMENTS

| | | | |
|---|---|---|---|
| 4,961,623 A | 10/1990 | Midkiff et al. ........... 350/96.2 |
| 5,042,901 A | 8/1991 | Merriken et al. ........... 385/135 |
| 5,121,458 A * | 6/1992 | Nilsson et al. ........... 385/100 |
| 5,125,060 A | 6/1992 | Edmundson ........... 385/100 |
| 5,210,812 A | 5/1993 | Nilsson et al. ........... 385/100 |
| 5,440,665 A | 8/1995 | Ray et al. ........... 385/135 |
| 5,528,718 A | 6/1996 | Ray et al. ........... 385/136 |

(Continued)

FOREIGN PATENT DOCUMENTS

| DE | 3537684 | 4/1987 |
|---|---|---|
| EP | 1052533 A1 | 4/2000 |
| JP | 62-054204 | 3/1987 |
| JP | 2001116968 | 4/2001 |

OTHER PUBLICATIONS

Tyco Electronics Raychem Product Sheet, FITS FOSC—Factory Installed Termination System for Fiber Optic Cable Splices, 1 page.
Patent Abstract of Japan, 2001051131, Feb. 23, 2001.

*Primary Examiner*—Jennifer Doan (57) ABSTRACT

A factory-prepared preterminated and pre-connectorized fiber optic distribution cable having at least one mid-span access location for providing access to a plurality of preterminated optical fibers pre-connectorized with a multi-fiber connector is provided. Also provided is a method of forming a pre-connectorized fiber optic distribution cable by terminating and pre-connectorizing a predetermined number of the plurality of optical fibers of the cable to create a pre-connectorized mid-span access location. The fiber optic distribution cable provides a low profile mid-span access location that is sufficiently flexible to be installed through relatively small-diameter buried conduits and over aerial installation sheave wheels and pulleys without violating the minimum bend radius of the cable or the optical fibers. A protective encapsulant protects and seals the mid-span access location during cable reeling, unreeling, installation and until the access location is needed for interconnecting a connectorized fiber optic drop or branch cable.

20 Claims, 8 Drawing Sheets

U.S. PATENT DOCUMENTS

| | | |
|---|---|---|
| 5,657,413 A | 8/1997 | Ray et al. .................... 385/139 |
| 6,134,363 A * | 10/2000 | Hinson et al. ............... 385/100 |
| 6,466,725 B1 | 10/2002 | Battey et al. ................ 385/135 |
| 6,619,697 B1 | 9/2003 | Griffioen et al. ......... 285/126.1 |
| 2003/0118295 A1 | 6/2003 | Lail et al. |
| 2003/0118313 A1 | 6/2003 | Nicolas |

* cited by examiner

PRE-CONNECTORIZED FIBER OPTIC DISTRIBUTION CABLE HAVING MULTIFIBER CONNECTOR

CROSS REFERENCE TO RELATED APPLICATION

This application is a continuation-in-part of application Ser. No. 10/724,244, filed Nov. 26, 2003, now abandoned, and a continuation-in-part of application Ser. No. 10/736,394, filed Dec. 15, 2003, now U.S. Pat. No. 7,006,739.

BACKGROUND OF THE INVENTION

1. Field of the Invention

The present invention relates generally to a pre-connectorized fiber optic distribution cable and, more particularly, to a factory-assembled fiber optic distribution cable having at least one predetermined mid-span access location for providing access to a plurality of optical fibers that are preterminated and pre-connectorized to a multifiber connector.

2. Description of the Related Art

Optical fiber is increasingly being used for a variety of broadband applications including voice, video and data transmissions. As a result, there is a need for connecting remote locations to a fiber optic distribution cable in order to provide broadband services to an end user, commonly referred to as a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx." networks. To provide these services to the subscriber, FTTx networks must include a large number of interconnection points, referred to herein as "tap points," at which one or more optical fibers of a distribution cable are interconnected or mated to optical fibers of one or more cables leading to a subscriber location. In addition, in order to reduce installation labor costs in FTTx networks, communications service providers are increasingly demanding factory-prepared interconnection solutions, commonly referred to as "plug-and-play" systems.

To supply the large number of tap points needed and to satisfy the demand for plug-and-play systems, it is apparent that more efficient methods of providing mid-span access locations along the length of a distribution cable are needed. Presently, to perform a mid-span access of a distribution cable, a field technician first removes a section of the cable sheath at a convenient location along an installed distribution cable. Once the sheath is removed, the technician gains access to pre-selected optical fibers through the cable sheath, severs the accessed optical fibers and withdraws a useable length of the terminated optical fibers from the distribution cable. The useable length of the terminated optical fibers provides the field technician with sufficient length to splice one or more optical fibers of a cable comprising a lesser amount of optical fibers than the distribution cable (typically referred to as a "drop cable") to the pre-selected optical fibers of the distribution cable. After splicing is completed, the mid-span access location is typically covered using an enclosure designed to protect the splices and the exposed section of the distribution cable. This time consuming process is typically accomplished by a highly skilled field technician at a significant cost and under less than ideal working conditions.

Several approaches have been developed to overcome the disadvantages of accessing, terminating and splicing optical fibers in the field. In one approach, the splicing of drop cables to the distribution cable is performed at a factory during the manufacturing of the cable. The preterminated distribution cable, including the main cable, drop cables and associated splice closures, are assembled and wound onto a cable reel to be delivered to an installation site. Accordingly, favorable conditions in the factory for making high quality splices may be utilized, thereby increasing splice quality and also reducing the expense, difficulty and unfavorable conditions associated with splicing in the field. One disadvantage of this approach is that the drop cables and the relatively bulky and inflexible splice closures are attached to the distribution cable prior to installation. Accordingly, installation through small diameter conduits and over sheave wheels and pulleys is substantially more difficult, and sometimes impossible. Another disadvantage is the fact that if a mid-span access location remains unused following installation, the obtrusive splice closure and drop cables remain attached to the distribution cable. In contrast, a low-profile distribution cable assembly having a pre-connectorized mid-span access location allows a field technician to readily interconnect drop cables and attach a closure to the distribution cable following installation and as the mid-span access location is needed to provide service to subscribers.

Accordingly, it would be desirable to provide a factory-assembled fiber optic distribution cable having one or more predetermined mid-span access locations along the length of the distribution cable for accessing a plurality of optical fibers that are preterminated and pre-connectorized to a multifiber connector wherein each such mid-span access location has an outer diameter that is only minimally larger than the outer diameter of the distribution cable. It would also be desirable to provide a pre-connectorized fiber optic distribution cable having one or more low profile mid-span access locations that is suitable for both buried installations (e.g., through small-diameter conduit) and aerial installations (e.g., over sheave wheels and pulleys). It would further be desirable to provide a factory-assembled pre-connectorized fiber optic distribution cable that is readily installed and adapted to be interconnected with pre-connectorized drop cables and configured with a variety of different closures in the field as needed.

BRIEF SUMMARY OF THE INVENTION

To achieve the foregoing and other objects, and in accordance with the purposes of the invention as embodied and broadly described herein, the present invention includes various embodiments of a factory-assembled fiber optic distribution cable having at least one predetermined mid-span access location along the length of the distribution cable for providing access to a plurality of preterminated and pre-connectorized optical fibers. Each such mid-span access location is fully protected during cable reeling and un-reeling, during the installation process, and until needed. The pre-connectorized fiber optic distribution cable is configured for ease of installation and may be installed through a small-diameter conduit system or around aerial installation sheave wheels and pulleys because of its low profile (i.e, small outer diameter) and relative flexibility. Each mid-span access location provides access to a plurality of preterminated and pre-connectorized optical fibers for interconnecting at least one drop cable to the distribution cable. In preferred embodiments, each mid-span access location provides at least one optical fiber ribbon preterminated and pre-connectorized to a multi-fiber ferrule, such as an MT ferrule.

In the various exemplary embodiments described herein, the present invention comprises a fiber optic distribution cable having at least one mid-span access location at which a plurality of optical fibers accessed from the distribution cable are pre-connectorized (i.e., connectorized in the factory) with a multi-fiber ferrule operable for receiving a connectorized branch cable or drop cable. Although the drawing figures depict only a single mid-span access location, it is envisioned that any number of factory-prepared access locations may be provided on a distribution cable to accommodate a customized distribution and termination solution for a fiber optic communications network. At each mid-span access location, a plurality of optical fibers are terminated and furcated from the remaining optical fibers of the distribution cable. The preterminated optical fibers are connectorized to be ultimately optically connected to respective optical fibers of one or more fiber optic branch cables or fiber optic drop cables. The optical fibers of the branch cables or drop cables are preferably also connectorized so that the distribution cable and the branch cables or drop cables provide a true plug-and-play interconnection system, thereby enabling a less experienced and less skilled field technician to readily install the fiber optic communications network. The branch cable may be used to connect the preterminated optical fibers of the distribution cable to another distribution point, such as an optical network terminal. The drop cables may be used to connect an optical fiber of the distribution cable to a subscriber premises, thereby extending an all-optical communications network entirely to the subscriber premises. As used hereinafter in the description of the exemplary embodiments, the terms fiber optic drop cable and drop cable should be understood to include any fiber optic cable, monotube, tether or like conduit for routing and protecting at least one optical fiber, including a fiber optic branch cable or secondary distribution cable.

In one embodiment, the preterminated and pre-connectorized distribution cable comprises a fiber optic cable having at least one optical fiber disposed within a buffer tube, and preferably, an optical fiber ribbon disposed within a buffer tube. In order to achieve a low profile mid-span access in the factory, a section of the cable sheath is removed to expose the at least one buffer tube within the distribution cable. For each access location, the appropriate buffer tube is accessed in at least two places by ring cutting or using a fiber access tool. Starting at the appropriate buffer tube access point, pre-selected optical fibers are located and severed. The remaining optical fibers are not severed and continue downstream through the distribution cable. The terminated optical fibers may then be fished out of a second, upstream access point in the buffer tube, thereby exposing a useful length of optical fiber.

In another embodiment, the present invention provides a preterminated and pre-connectorized fiber optic distribution cable having at least one predetermined mid-span access location at which a plurality of preterminated optical fibers are accessed and optically connected to a multi-fiber connector. The distribution cable comprises at least one buffer tube comprising two or more optical fibers, a buffer tube transition piece operable for transitioning the optical fibers out of the buffer tube, a longitudinally extending optical fiber guide channel operable for storing a useable length of the preterminated and pre-connectorized optical fibers, and a protective means operable for protecting the at least one buffer tube, the buffer tube transition piece, the optical fiber guide channel and the preterminated and pre-connectorized optical fibers during installation. Each mid-span access location comprises an outer diameter that is minimally larger than the original outer diameter of the distribution cable. The distribution cable has an outer diameter and a flexibility that permits installation through a small-diameter conduit or around aerial installation sheave wheels and pulleys.

In a further embodiment, the present invention provides a method of mid-span accessing optical fibers from a fiber optic distribution cable at a predetermined mid-span access location. The method comprises: (1) removing a predetermined length of a cable sheath to expose a predetermined length of at least one buffer tube; (2) cutting at least a first and a second access point on an appropriate buffer tube along the buffer tube length about 9 to 15 inches apart from one another; (3) severing optical fibers at the first access point to produce preterminated optical fibers; (4) fishing the preterminated optical fibers out of the second access point to withdraw a useable length of preterminated optical fibers; (5) transitioning the preterminated optical fibers through a buffer tube transition piece; and (6) optically connectorizing the preterminated optical fibers to a multi-fiber connector.

In a still further embodiment, the present invention provides a pre-connectorized fiber optic distribution cable for use in an optical network. The pre-connectorized distribution cable comprises a plurality of mid-span access locations at predetermined locations along the length of the distribution cable. The pre-connectorized distribution cable may be readily deployed in an optical network in a pre-assembled and protected configuration. In the field, the protective components may be easily removed and a closure attached to the distribution cable to conceal and protect the predetermined mid-span access location. In one embodiment, the preterminated and pre-connectorized optical fibers may be positioned within a connector port provided on an exterior wall of the closure. A pre-connectorized drop cable from the optical network may then be readily connected to the connector port to optically connect one or more optical fibers of a drop cable with one or more optical fibers of the distribution cable.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The pre-connectorized fiber optic distribution cable of the present invention comprises at least one predetermined access location, referred to herein as a "mid-span access location," along the length of the cable for providing access to a plurality of optical fibers optically connected to a multi-fiber ferrule. In preferred embodiments, the pre-connectorized distribution cable comprises a plurality of predetermined access locations spaced apart along the cable length, thus providing multiple access locations, or tap points, for ultimately joining connectorized drop cables or other cables to the distribution cable in the field. The pre-connectorized fiber optic distribution cable may be wound upon a reel for distribution and deployment in aerial and buried applications. The pre-connectorized cable is manufactured in a factory, thus eliminating the need for first installing a fiber optic cable and then performing a mid-span access and splicing in the field. The cable system of the present invention offers communication service providers factory-prepared and connectorized access locations on a distribution cable with an outer diameter that is only minimally larger than the outer diameter of the original cable. Once the cable system is installed, a portion of a protective covering is removed to expose at least one optical connector, and any conventional enclosure may be added to the system in order to provide protection and drop cable connection points.

Throughout the specification, the term "distribution cable" is intended to include all types of optical fiber cables comprising a plurality of optical fibers within a cable jacket including, but not limited to, loose tube, monotube, central tube, tight buffered, ribbon, drop, armored, flat dielectric drop and the like. The distribution cable comprises a cable sheath, buffer tubes, an optical transmission component and a strength component. In the embodiments shown, the distribution cable comprises buffer tubes including ribbon optical fibers for exemplary purposes only. The distribution cable may also comprise individual optical fibers that are ribbonized prior to terminating in a multi-fiber connector. Ribbon optical fibers consist of multiple fibers (typically six, eight or twelve) bound together in a generally planar ribbon. In various embodiments the ribbon fibers may be color-coded for easy identification. It is understood that the ribbon fibers may be either single mode or multimode and are preferably contained within a buffer tube. In preferred embodiments, a single multi-fiber connector, such as a conventional Mechanically Transferable (MT) ferrule, may terminate each ribbon fiber. In alternative embodiments, the ribbon fiber may be fanned out into a plurality of single fiber connectors. It is understood that other cable types may be used in conjunction with the present invention. The distribution cable is preferably designed to provide stable performance over a wide range of temperatures and to be compatible with any telecommunications grade optical fiber.

In the exemplary embodiments shown and described herein, the multi-fiber connector shown is a generic MT ferrule, however, other multi-fiber ferrules such as MTP, MPO and MT-RJ may be used without departing from the scope of the invention. The MT ferrule is mounted upon the end of the terminated ribbon optical fibers accessed from a predetermined location along the cable length. The MT connector provides a semi-permanent connection between the terminated ribbon fiber and optical fibers associated with a closure or drop cable(s). If necessary, the MT connector may be connected and disconnected in new configurations as desired. By providing a connector, as opposed to splicing optical fibers at an access location, miscalculations in the placement of an access location along the cable length may be adjusted by connecting connectorized drop cables having predetermined lengths to the connector. If it is desired to later increase the length of a drop cable or interconnect something other than a drop cable, such as a multi-port connection terminal, the existing drop cable can be disconnected and replaced without having to perform optical fiber splicing.

Figure 1:
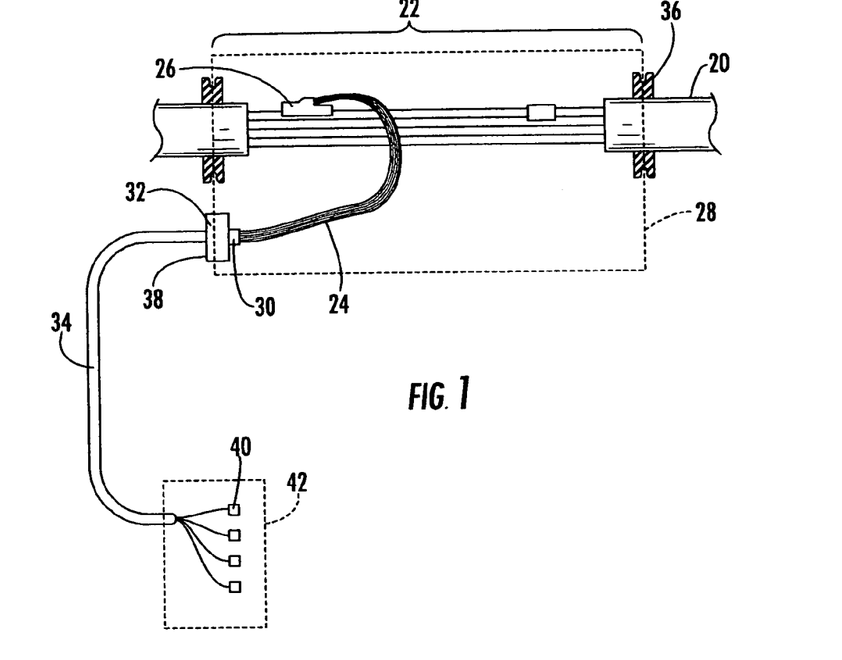
FIG. 1 is a schematic diagram illustrating a pre-connectorized fiber optic distribution cable according to the present invention installed within one example of a conventional fiber optic communications network.

Referring now to FIG. 1, the fiber optic distribution cable 20 having at least one pre-connectorized access location 22 according to the invention is shown installed within one example of a conventional fiber optic communications network. In particular, the ribbon optical fibers 24 preterminated and accessed at one of the predetermined access locations along the length of the fiber optic distribution cable 20 is routed through a buffer tube transition piece 26. A conventional closure 28 is added to the cable 20 after installation in order to provide protection to the access location 22. An MT connector 30 terminated to the ribbon optical fibers 24 in a known manner is optically connected to a multi-fiber connector 32 of a secondary fiber optic cable 34. The closure 28 is provided with a pair of through ports 36 for sealingly receiving the distribution cable 20 and an exit port 38 for sealingly receiving the secondary fiber optic cable 34. The secondary cable 34 is pre-connectorized and preferably comprises one or more single-fiber or multi-fiber connectors 40 for interconnecting the accessed ribbon fibers 24 of the distribution cable 20 to respective optical fibers of the communications network within a conventional network connection terminal 42, such as but not limited to, a local convergence cabinet (LCC), a pedestal, a network access point (NAP) or a network interface device (NID) of the types available from Corning Cable Systems LLC of Hickory, N.C. In the exemplary communications network shown, the secondary fiber optic cable 34 terminates in a plurality of optical connectors 40 within the connection terminal 42. Although not shown, connectorized drop cables may then be routed from the connection terminal 42 to one or more subscriber premises.

Figure 2:
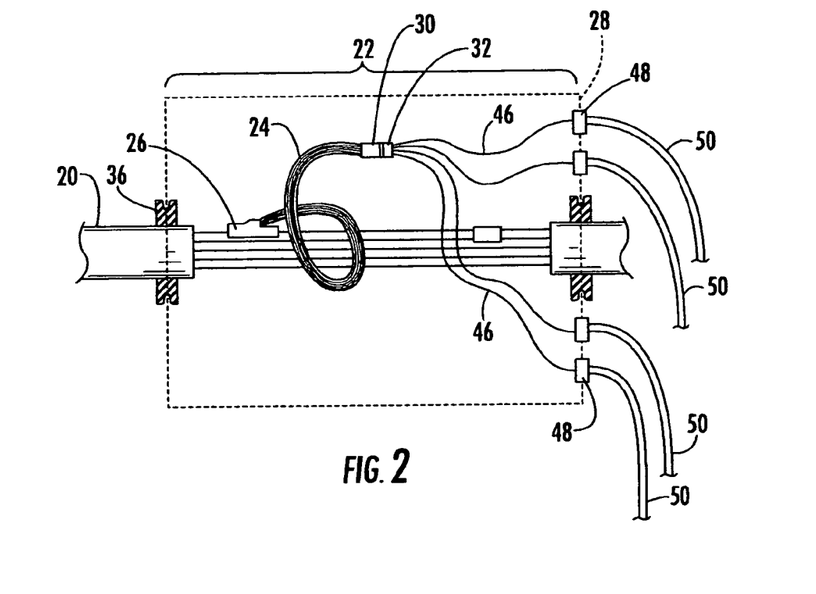
FIG. 2 is a schematic diagram illustrating a pre-connectorized fiber optic distribution cable according to the present invention installed within another example of a conventional fiber optic communications network.

Referring to FIG. 2, the fiber optic distribution cable 20 having at least one pre-connectorized access location 22 according to the invention is shown installed within another example of a conventional fiber optic communications network. In this example, as with the example described above, an access location protective covering (not shown) has been removed after installation of the cable 20 in order to expose the ribbon optical fibers 24 terminated and routed through the buffer tube transition piece 26. A conventional closure 28 is added over the access location 22 after installation in order to provide protection to the access location 22. An MT connector 30 of the ribbon fibers 24 is optically connected in a known manner to a multi-fiber connector 32 terminated to a plurality of optical fibers 46 routed to connector ports 48 located in an exterior wall of the closure 28. In one embodiment, each connector port 48 may be occupied with a receptacle designed to receive a connectorized drop cable 50. Individual drop cables 50 may be routed to subscriber premises. The closure 28 further includes a pair of through ports 36 for sealingly receiving the distribution cable 20. The drop cables 50 may also be routed to a conventional network connection terminal, such as but not limited to, a local convergence cabinet (LCC), a pedestal, a network access point (NAP) or a network interface device (NID) of the types available from Coming Cable Systems LLC of Hickory, N.C.

It should be understood that the communication networks shown in FIGS. 1 and 2 may be modified to accommodate the pre-connectorized fiber optic distribution cable in any known manner. Specific modifications may include closure design and changes in optical fiber routing within the closure 28. The closure 28 may be designed to accommodate any number of drop cables, any number of receptacles or any method for securing the optical connection point in the closure 28. In the preferred embodiment, the preterminated optical fibers 24 may be directly connectorized. This process involves mounting the multi-fiber connector directly onto the ends of the optical fibers withdrawn from the buffer tube. In other embodiments, the preterminated optical fibers 24 are spliced, preferably fusion spliced, to buffered or jacketed pigtails having bare optical fibers at one end and a multi-fiber connector at the other end. This embodiment may be used to provide a total fiber length greater than that of withdrawn and direct-connectorized optical fibers. In this process, the pigtail is spliced to the withdrawn and preterminated length of optical fiber in the factory. Splice points would be protected using splice protectors, which are operable for holding and protecting the splice junction between the end of the preterminated optical fiber and the end of the pigtail.

Figure 3:
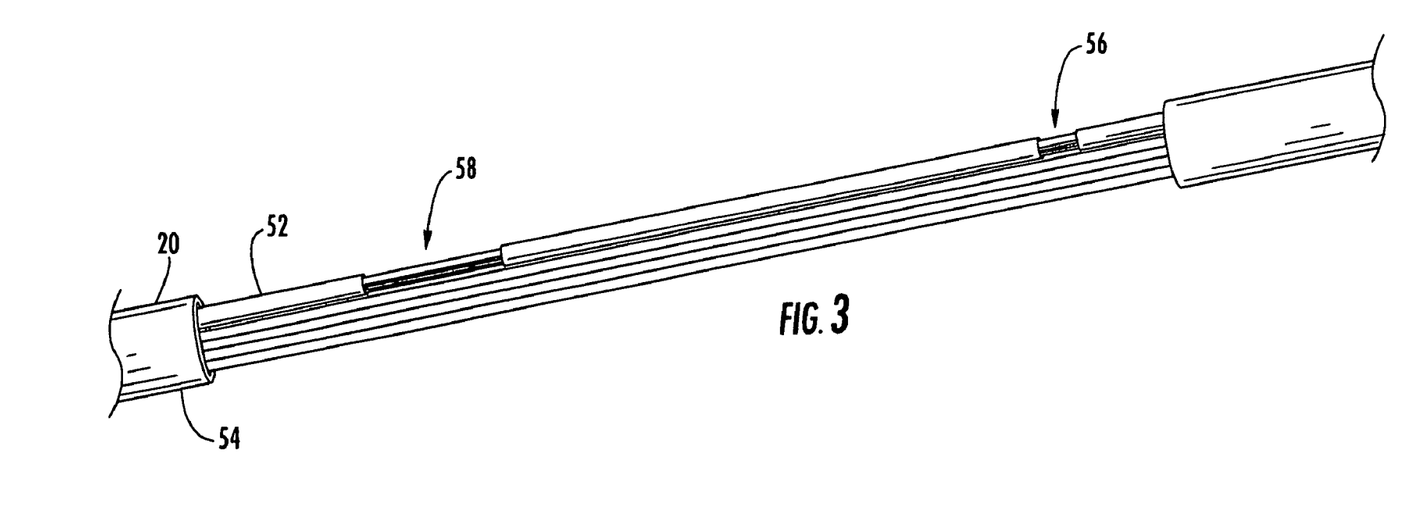
FIG. 3 is a perspective view of a pre-connectorized fiber optic distribution cable having a predetermined mid-span access location formed by removing a portion of the cable sheath to create a plurality of access points on a buffer tube in accordance with an exemplary embodiment of the present invention.

Referring to FIG. 3, a perspective view of a pre-connectorized fiber optic distribution cable 20 having a predetermined access location created by removing portions of the cable sheath in order to access a buffer tube is shown. In the exemplary embodiment shown, the fiber optic distribution cable 20 includes at least one buffer tube 52 disposed within a cable sheath 54. As is known by those skilled in the art, the distribution cable 20 as shown and described herein may include any known fiber optic cable having a fiber count greater than that of a drop cable and comprising at least one buffer tube 52. In preferred embodiments, each buffer tube 52 of the distribution cable 20 includes a water-blocking compound, such as a gel, to prevent water penetration into the buffer tubes 52. However, the distribution cable 20 may also be a "dry-tube" cable. Each buffer tube 52 may include any number of ribbon optical fibers, for example, ribbons of four, six, eight and twelve optical fibers may be used.

To achieve a mid-span, low profile access location, a section of the cable sheath 54 is severed and removed to expose the underlying buffer tubes 52. The exposed length of the buffer tubes 52 may vary. However, in a preferred embodiment the length ranges between about 10 and 30 inches. In a more preferred embodiment, the length ranges between about 14 and 20 inches. The exposed buffer tube 52 length allows for about 10 to 30 inches of ribbon optical fibers to be withdrawn from the buffer tube 52 for connectorization, thereby providing sufficient slack fiber length for more than one attempt. The cable sheath 54 is removed by ring cutting at predetermined locations and slitting the cable sheath 54 longitudinally into two substantially equal halves without damaging the buffer tubes 52.

For a given mid-span access location, two sections of the appropriate buffer tube 52 are removed. A first downstream section 56 is created by ring cutting the buffer tube 52 and completely removing about a 1 to 5 inch section of the tube 52. All or part of the appropriate underlying optical fiber ribbon is then severed. A ring cut is then made upstream about 9 to 12 inches behind the downstream section 56. The upstream section 58 may be created by making one ring cut and sliding the buffer tube portion between the two sections 56, 58 downstream until it rests against the buffer tube end exposed by the first cut. The upstream section 58 may also be created by ring cutting the buffer tube 52 in two places and removing about a 1 to 5 inch section as before. In another embodiment, the buffer tube 52 may be accessed in two places using a standard No-Slack Optical Fiber Access Tool (NOFAT) available from Corning Cable Systems LLC of Hickory, N.C. The NOFAT tool is suitable for use in locations in which a minimal amount of cable slack can be obtained and the buffer tubes 52 remain wrapped around the central member. The NOFAT tool provides a guide that allows a scalpel to slice a section of a buffer tube 52 without cutting completely through the buffer tube 52 or the optical fibers disposed within the buffer tube 52. The NOFAT tool is compatible with standard Corning Cable Systems buffer tube wall thicknesses. In any access method employed, the purpose is to remove portions of the buffer tube 52 such that the ribbon optical fiber may be severed a downstream location and fished out of an upstream location. Once severed, the ribbon optical fibers are preterminated from the distribution cable 20 and the remaining intact ribbon optical fibers continue downstream.

In an alternative embodiment, three access locations, typically about 10–15 inches apart, may be cut on the appropriate buffer tube 52. As will be readily understood by those skilled in the art, three access locations are specifically advantageous for withdrawing longer lengths of optical fiber from a buffer tube filled with a water-blocking gel. Starting at the downstream buffer tube access point, predetermined ribbon optical fibers are accessed and severed. The severed ribbon optical fibers are then fished out of the middle access point on the same buffer tube, exposing about 12 to 14 inches of fiber length. The same ribbon optical fibers are then fished out of the buffer tube 52 a second time at a third access point upstream of the middle access point, thereby exposing a total ribbon fiber length of about 20 to 30 inches. The minimum bend radius of the ribbon fibers is not violated during the process of fishing-out the fibers. After removing the ribbon fibers from the buffer tube 52, any water-blocking gel (if present within the buffer tube 52) is cleaned off the exposed length of ribbon optical fibers.

In various cable designs, appropriate buffer tubes 52 and ribbon fibers may be located within the cable by color-coded markings or colored tubing. Furthermore, the predetermined access locations may be positioned along the distribution cable 20 at locations in which inflection points occur. An inflection point is a point along a stranded cable at which the helical winding of the buffer tubes switches its winding direction, and typically occurs about every meter along the length of the cable. The inflection points along a distribution cable 20 may be marked on the cable sheath 54. The inflection points allow enough buffer tube slack to raise the buffer tube slightly above the remaining buffer tubes and the surrounding cable structure to insert a cutting tool.

Figure 4:
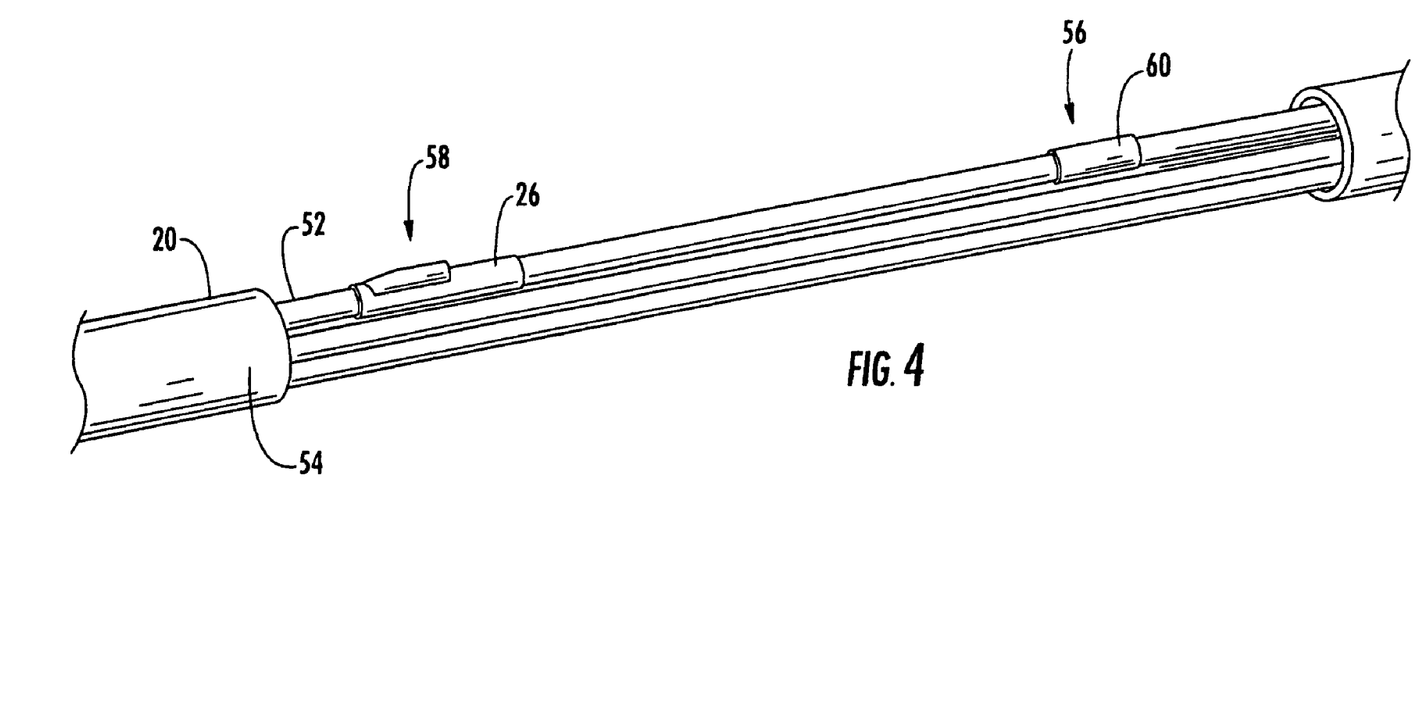
FIG. 4 is a perspective view of the pre-connectorized fiber optic distribution cable of FIG. 3 illustrating a buffer tube transition piece and a C-shaped protection member that cover removed portions of the accessed buffer tube in accordance with an exemplary embodiment of the present invention.
Figure 5:
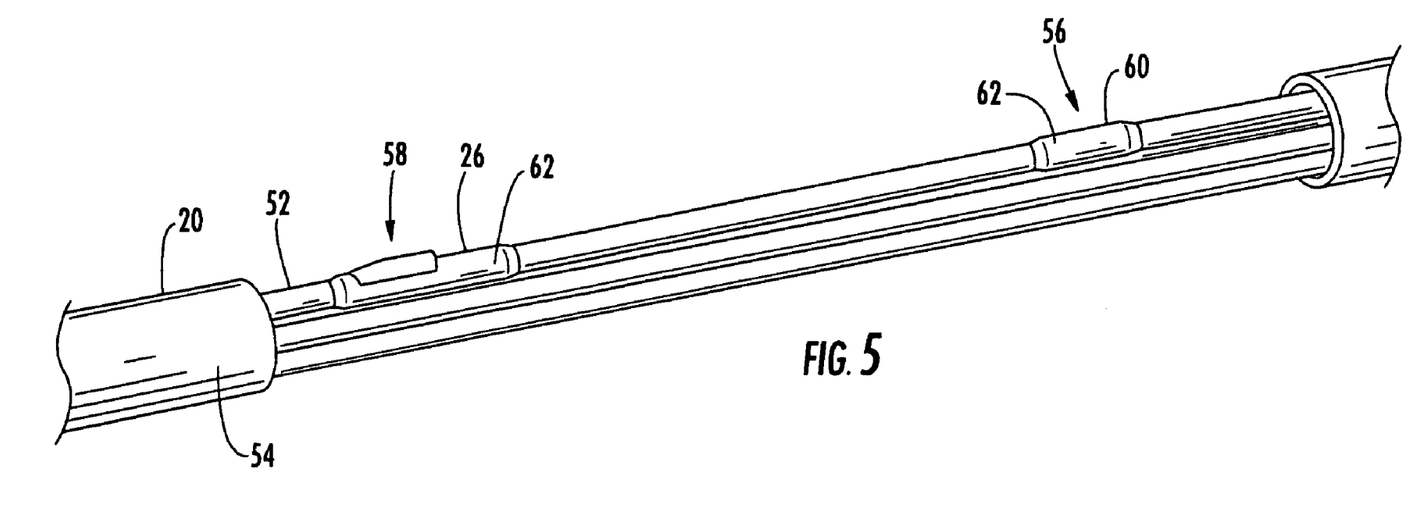
FIG. 5 is a perspective view of the pre-connectorized fiber optic distribution cable of FIG. 4 illustrating sealing of the exposed portions of the buffer tube in accordance with an exemplary embodiment of the present invention.

Referring to FIG. 4, once the ribbon optical fibers (shown in FIG. 6) have been withdrawn from their respective buffer tube 52, the ribbon fibers are fed through and arranged in the buffer tube transition piece 26. The buffer tube transition piece 26 is preferably made of rubber or another flexible material to permit the buffer tube transition piece 26 to bend slightly to conform to the curvature of the buffer tube 52 to which it is attached. The buffer tube transition piece 26 is positioned around the upstream access point 58 to protect the exposed open portion of the buffer tube 52. In a preferred embodiment, the buffer tube transition piece 26 is C-shaped and installed at the exposed buffer tube section where the ribbon fibers exit. The buffer tube transition piece 26 defines an optical fiber slot operable for maintaining the optical fibers in a linear array. Once the ribbon fibers have been routed, a slot provided in the buffer tube transition piece 26 may be filled with a sealing material, such as a silicone elastomer or epoxy material, to seal the junction, prevent torque in the transition piece 26 and prevent any water-blocking gel that may be present from leaking out of the buffer tube 52. The downstream access location 56 may also be capped with a flexible, C-shaped protection component 60 to protect any remaining ribbon fibers that are exposed within the buffer tube 52 and prevent any water-blocking gel that may be present from leaking out of the buffer tube. Alternatively, the section of the buffer tube 52 that was removed to form the downstream access location 56 may be replaced and secured in position using an adhesive wrap or tape, such as electrical tape. Referring to FIG. 5, once the flexible members 26, 60 are in place, heat deformable tape 62 or a zippered heat deformable material may optionally be used to completely seal the buffer tube access locations.

Figure 6:
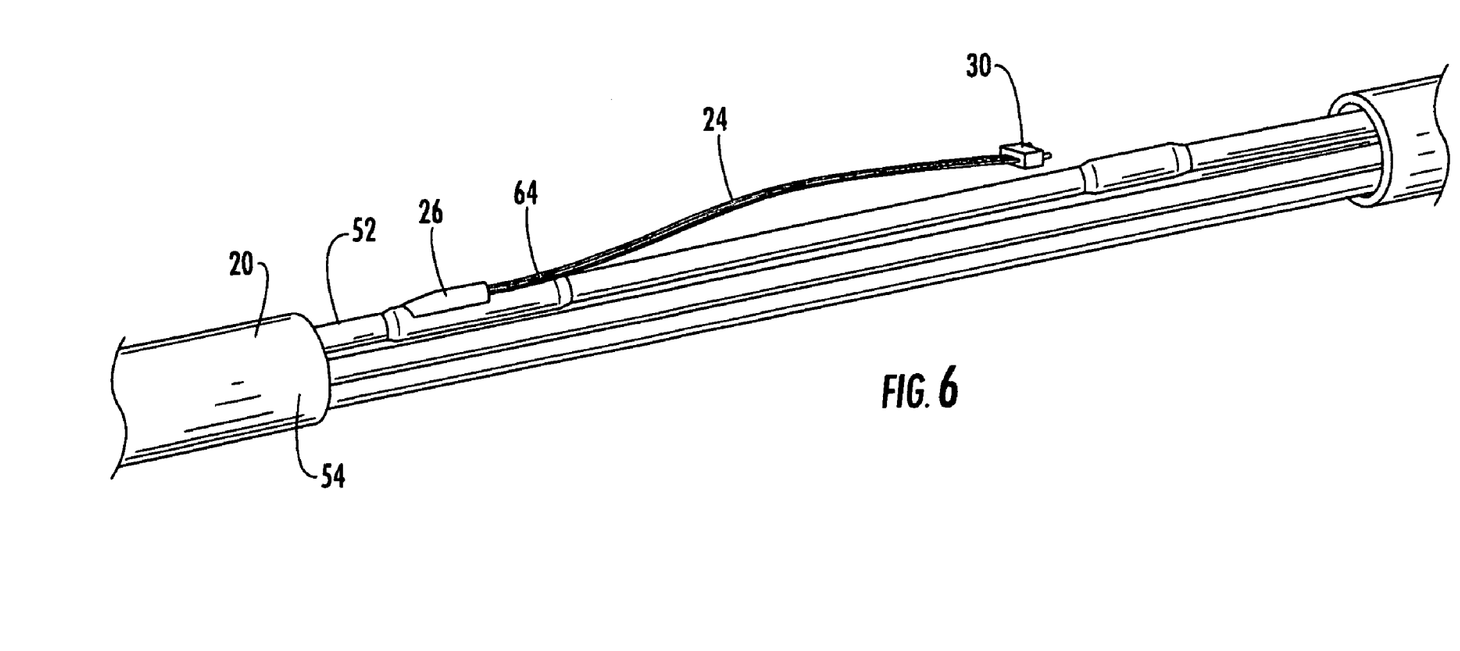
FIG. 6 is a perspective view of the pre-connectorized fiber optic distribution cable of FIG. 5 illustrating the routing of preterminated optical fibers of an optical fiber ribbon out of the buffer tube via the buffer tube transition piece, wherein the optical fibers terminate in a multi-fiber ferrule in accordance with an exemplary embodiment of the present invention.

Referring to FIG. 6, ribbonized optical fibers 24 are shown routed through the buffer tube transition piece 26 operable for transitioning a plurality of preterminated optical fibers out of the buffer tube 52 and the distribution cable 20. As previously stated, the optical fibers that are terminated may be individual optical fibers that are subsequently ribbonized using a FOTA tool available from Corning Cable Systems LLC of Hickory, N.C. The ribbonized optical fibers are inserted into a fanout tube 64 consisting of an outer jacket, Kevlar and an inner tube. The fanout tube is inserted into the molded buffer tube transition piece 26 and bonded with epoxy. The optical fiber slot should be positioned downstream of the origination of the optical fibers so that the optical fibers are smoothly transitioned without violating their minimum bend radius. The severed ends of the ribbon optical fibers 24 are terminated with the multi-fiber connector 30, such as an MT ferrule.

Figure 7:
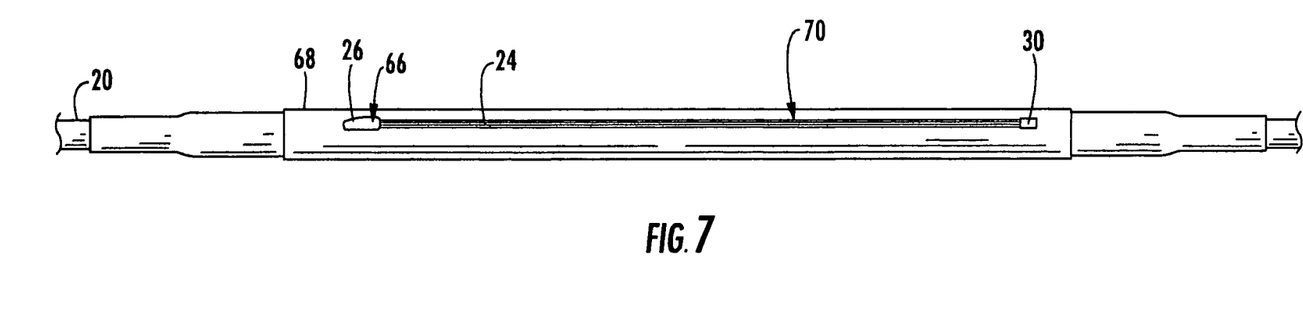
FIG. 7 is a perspective view of the pre-connectorized fiber optic distribution cable of FIG. 6 illustrating a C-shaped protection member operable for protecting the accessed optical fibers during installation in accordance with an exemplary embodiment of the present invention.

Referring to FIG. 7, to protect the remaining exposed portion of the buffer tubes 52 and to provide a channel for guiding the optical fibers along the length of the distribution cable 20, the connectorized optical fibers 24 are routed through a guide channel opening 66 into a longitudinally extending guide channel member 68. The member 68 is preferably molded into a C-shape for attachment to the distribution cable 20 without threading, and is made of a flexible material such that the molded member 68 flares open for installation around the cable. The buffer tube transition piece 26 is axially aligned with the guide channel opening 66. The C-shaped molded member 68 further defines an elongate optical fiber guide channel 70 operable for routing, storing and protecting the entire length of pre-connectorized optical fibers 24. The optical fiber guide channel 70 is also axially aligned with the buffer tube transition piece 26. In various embodiments, the C-shaped molded member 68 may have a single guide channel or multiple guide channels, and a single channel opening or multiple channel openings. The channel opening and the guide channel(s) may extend straight along the cable 20 or be wound helically around the cable diameter. If helical, the C-shaped molded member 68 may be formed as a planar sheet and wrapped around the distribution cable 20 to obtain the helical profile. The length of the C-shaped molded member 68 may vary. However, in a preferred embodiment, the length ranges between about 25 and 40 inches.

Figure 8:
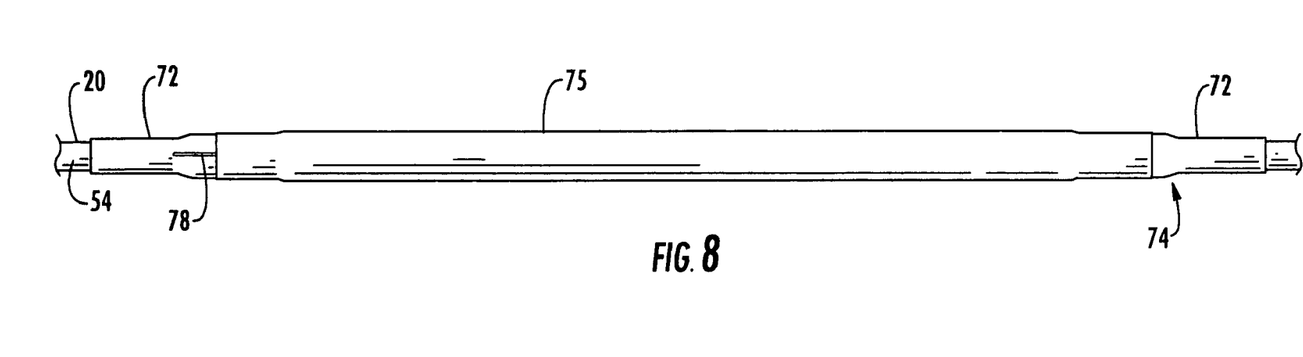
FIG. 8 is a perspective view of the pre-connectorized fiber optic distribution cable of FIG. 7 illustrating sealing the mid-span access location using a heat deformable material in accordance with an exemplary embodiment of the present invention.

Referring to FIG. 8, the C-shaped molded member 68 is positioned over the entire exposed buffer tube section and held in place using heat deformable material 72 positioned at both ends of the C-shaped molded member 68. The heat deformable material 72 is operable for securing the C-shaped molded member 68 and providing a smooth transition between the differing outer diameters of the cable sheath 54 and the C-shaped molded member 68, thus aiding installation through a small-diameter conduit or over aerial installation sheave wheels and pulleys. The C-shaped molded member 68 defines a shoulder 74 extending lengthwise a predetermined distance at each end of the C-shaped molded member 68, the shoulder 74 being operable for providing a securing point for the heat deformable material 72. A portion of the heat deformable material 72 is shrunk onto the underlying cable sheath 54. In a preferred embodiment, the heat deformable material 72 is glue-lined at both ends. Another single length of heat deformable material 72 is positioned over the middle portion of the C-shaped member 68 with two ripcords 78 disposed underneath. The two ripcords 78, spaced about 180 degrees apart, are tied to the distribution cable 20 at one of their ends away from the guide channel 70. Once the distribution cable 20 is installed, the ripcords are used to remove the heat deformable material 72 to expose the optical connector 30. After installation, the ribbonized optical fibers 24 may also be removed from the optical fiber guide channel 70 and the C-shaped molded member 68 removed and discarded if desired. However, it is not necessary to remove the C-shaped molded member 68 in order to access the multi-fiber connector 30.

Figure 9:
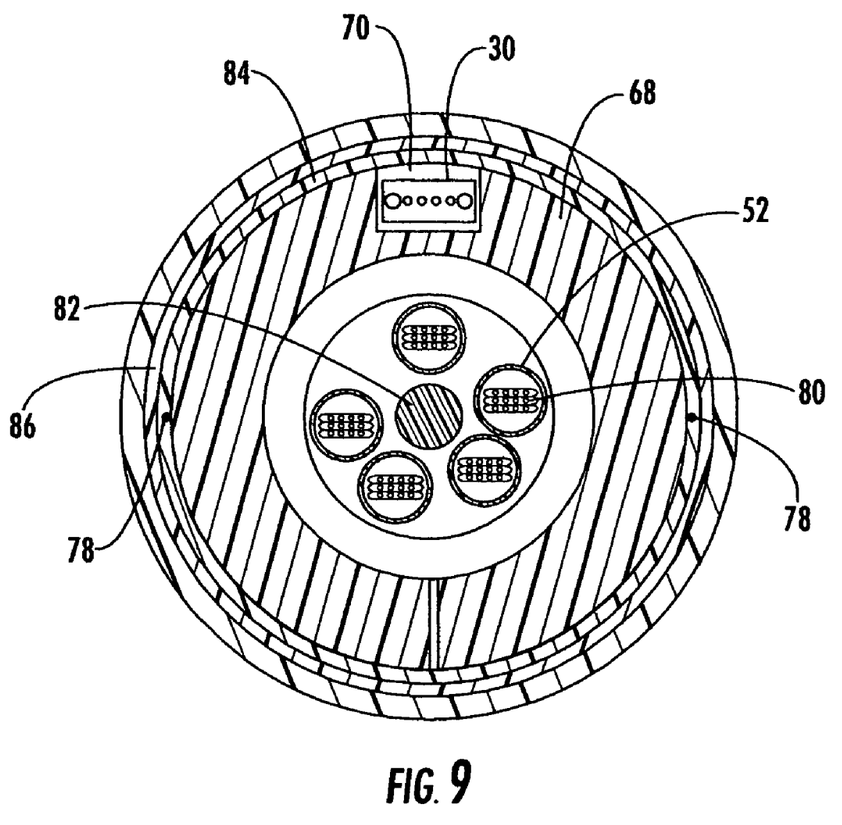
FIG. 9 is an enlarged cross-sectional view of the pre-connectorized fiber optic distribution cable of FIG. 8 taken through the multi-fiber ferrule.

Referring now to FIG. 9, an enlarged cross-sectional view of the pre-connectorized distribution cable of FIG. 8 taken through the connector 30 (i.e., multi-fiber MT ferrule) is shown. The exemplary cable shown is a cable comprising five gel-filled buffer tubes 52 with each buffer tube 52 comprising three ribbon optical fibers 80. As shown, each ribbon 80 comprises a planar array of 4 individual optical fibers. The cable is a loose tube design that facilitates mid-span access in a factory environment. A predetermined number of optical fibers, for example four, from the appropriate buffer tube 52 have been preterminated. The cable 20 further comprises a single, lengthwise extending central strength member 82 substantially centered within the plurality of buffer tubes 52. For certain cable types, a water-swellable tape and one or more dielectric strength members may be positioned around the plurality of buffer tubes 52. The cable 20 may further comprise a water-swellable yarn (not shown) helically wrapped around the central member 82 for additional strength and water protection. The remaining optical fibers within the buffer tubes 52 that have not been preterminated continue through the distribution cable 20, potentially being preterminated at another access location further downstream.

To maintain the preterminated ribbonized optical fibers 24 within the fiber guide channel 70, the C-shaped molded member 68 may be wrapped with Kapton™ tape 84. The Kapton® tape 84 substantially covers the C-shaped molded member 68 and may be helically wrapped. Conventional adhesive tape may be used to secure both ends of the Kapton™ tape 84. A water-swellable tape 86 may also be helically wrapped on top of the Kapton™ tape 84. One example of a suitable water-blocking tape includes a 35 mm non-woven water-blocking tape (#R-14-01-03) available from Scapa Polymerics of Manchester, England. The water-blocking tape 86 is operable for preventing water ingress into the distribution cable 20 at the mid-span access location. Water penetrating the outermost heat deformable material 72 contacts a super absorbent powder within the tape or yarn instantly forming a water blocking gel. The gel is then held in place, preventing further damage, by the strength of the non-woven material. If a gap is encountered between the heat deformable material 72 and the underlying material, or between the heat deformable material and a ripcord 78, the combination of powder, tapes and yarns fills the hole more thoroughly than traditional water-swellable materials. This prevents water vapor and high humidity from penetrating the cable even further.

Figure 10:
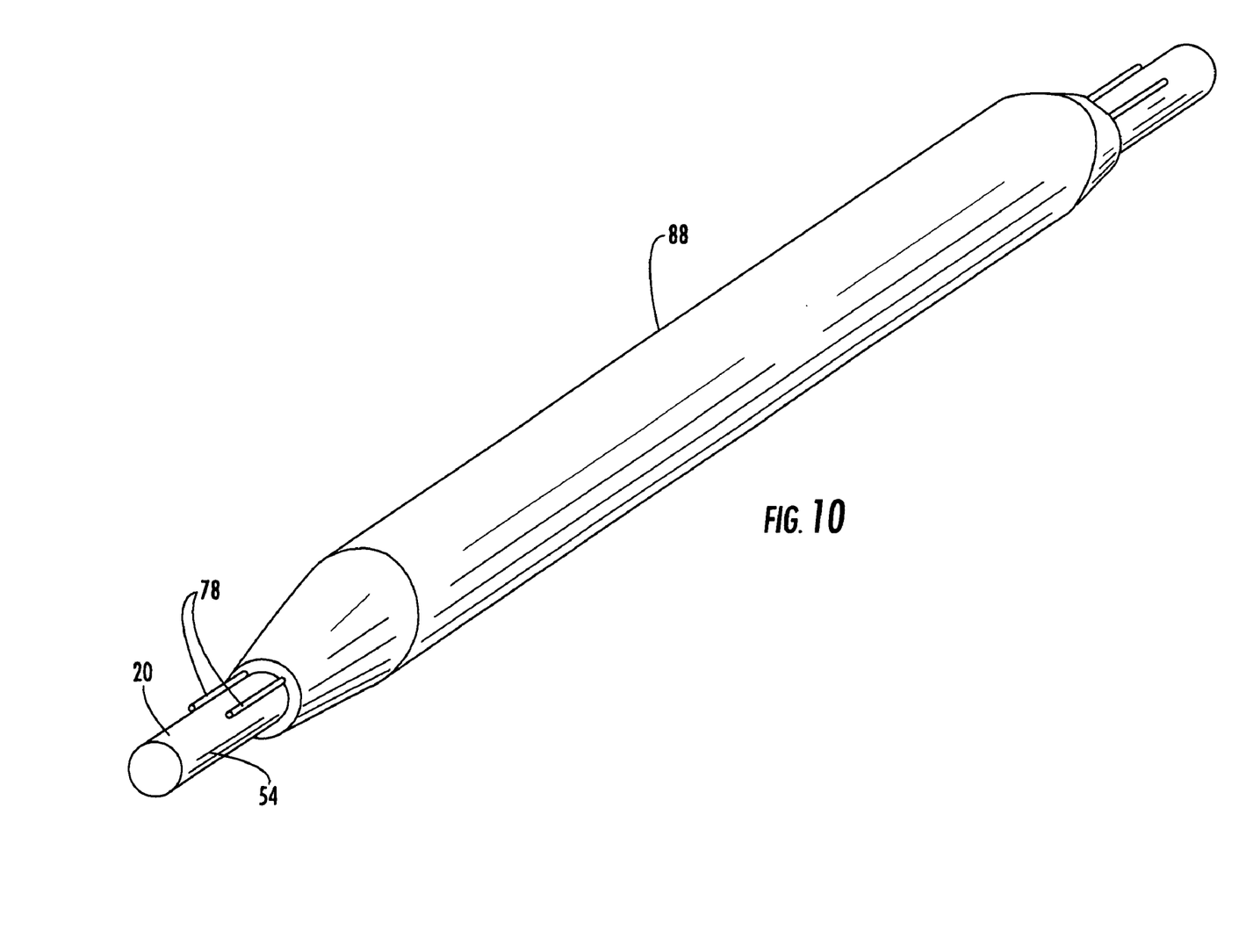
FIG. 10 is a perspective view of the pre-connectorized fiber optic distribution cable of FIG. 7 illustrating a mid-span access location that is overmolded in accordance with another exemplary embodiment of the present invention.

Referring to FIG. 10, the pre-connectorized distribution cable 20 is shown with an assembled access location and ready to be deployed in a buried or aerial installation. In this embodiment, a protective shell 88 formed by an over-molding process is operable for protecting the mid-span access location and pre-connectorized optical fibers during cable reeling, unreeling, installation and until the access location is utilized. At least one ripcord 78, and preferably a pair of ripcords spaced about 180 degrees apart, may extend a predetermined distance beyond the protective shell 88 at each end of the protective shell 88. The at least one ripcord 78 is operable for removing the protective shell 88 after cable installation. Disposed immediately underneath the protective shell 88 is an over-molding wrap (not shown) that provides a penetration barrier for the molding material. In a preferred embodiment, the over-molding wrap may also provide an additional seal for all components. In an alternative embodiment, a strength member (not shown) having a crush-resistant property may be disposed underneath the over-molding wrap and the protective shell 88.

To over-mold the access location, the distribution cable 20 is clamped into a tool that defines cavities for permitting molding material to flow. The distribution cable 20 is centered within the internal cavity of the tool. The tool comprises a plurality of injection ports for injecting the molding material. The molding material may include, but is not limited to, any polymeric material that may be injected in a liquid form and will set-up to form a substantially hardened protective shell (e.g., a two-part polyurethane or thermoplastic material). The molding material will flow into any void between the tool and the distribution cable 20. The distribution cable 20 may be axially centered within the over-molding tool. The over-mold material bonds to the over-molding wrap and at least about a 1 to 2 inch section of the cable sheath 54 at each end of the access location. Preferably, however, the over-mold material bonds to about a 4 to 7 inch section of the cable sheath 54 at each end. The protective shell 88 is removed after cable installation by pulling the at least one ripcord 78 through the over-molding wrap and removing the protective shell 88 to expose the C-shaped molded member 68. The C-shaped molded member 68 may then be removed to expose the pre-connectorized optical fibers.

The present invention provides a factory-prepared, low profile tap point that offers protection of pre-connectorized optical fibers during cable installation and is removable once installed. The primary advantages of the assembly are its overall size, with the outer diameter of the mid-span access location being minimally larger than the outer diameter of the undisturbed distribution cable, and the fact that the optical fibers are accessed, preterminated and pre-connectorized to eliminate the need for time consuming and costly splicing in the filed following installation of the distribution cable. The preterminated optical fibers may be direct connectorized with a multi-fiber ferrule, or may be fusion or mechanically spliced to a pigtail having a multi-fiber ferrule mounted upon one of its ends, as would be readily understood by those skilled in the art. A conventional enclosure may be used to seal the mid-span access location after the cable has been installed and the protective materials and C-shaped molded member removed. Preferably, the buffer tube transition piece remains attached to the accessed buffer tube. The preterminated and pre-connectorized fiber optic distribution cable and all of its components have a relatively low profile and sufficient degree of flexibility for the cable to be installed within a small-diameter bore or conduit or over aerial installation sheave wheels and pulleys.

The foregoing is a description of various embodiments of the invention that are provided here by way of example only. Although the preterminated and pre-connectorized fiber optic distribution cable and method of assembly have been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A pre-connectorized fiber optic distribution cable comprising:
   a plurality of optical fibers disposed within the cable;
   at least one predetermined access location along the length of the cable, the access location configured on the cable prior to installation of the cable in a fiber optic communications network, the access location providing access to the plurality of optical fibers such that two or more of the optical fibers are removed from the cable at the access location; and
   a multi-fiber connector mounted upon the ends of the optical fibers removed from the cable, the multi-fiber connectior disposed at least partially within a protective enclosed encapsulating the access location.

2. A pre-connectorized fiber optic distribution cable having at least one predetermined mid-span access location for accessing a plurality of preterminated and pre-connectorized optical fibers, the cable comprising:
    a plurality of optical fibers disposed within the cable;
    a transition piece operable for transitioning preterminated ones of the plurality of optical fibers out of the cable;
    a multi-fiber connector mounted upon the ends of the preterminated optical fibers;
    an elongate member defining a longitudinally extending optical fiber guide channel operable for storing a predetermined useable length of the preterminated optical fibers and the multi-fiber connector; and
    a protective means operable for protecting and sealing the at least one mid-span access location during installation of the pre-connectorized fiber optic distribution cable.

3. The pre-connectorized distribution cable of claim 2, wherein the protective means is a heat deformable material operable for securing the elongate member and for providing a smooth transition between an outer diameter of the cable and the elongate member.

4. The pre-connectorized distribution cable of claim 2, wherein the protective means is an over-molded encapsulating shell.

5. The pre-connectorized distribution cable of claim 2, wherein the distribution cable, the transition piece, the elongate member and the protective means are sufficiently flexible to permit installation through buried conduits and over aerial installation sheave wheels and pulleys.

6. The pre-connectorized distribution cable of claim 2, wherein a length of the preterminated and pre-connectorized optical fibers ranges from about 10 to about 30 inches.

7. The pre-connectorized distribution cable of claim 2, further comprising at least one ripcord disposed underneath the protective means operable for removing the protective means after cable installation.

8. The pre-connectorized distribution cable of claim 2, further comprising a closure affixed to the cable following installation and operable for encapsulating and sealing the at least one mid-span access location.

9. The pre-connectorized distribution cable of claim 2, wherein the transition piece and the elongate member are each C-shaped so as to permit the transition piece and the elongate member to be affixed to the cable without being threaded onto the cable.

10. The pre-connectorized distribution cable of claim 2, further comprising a water-swellable tape disposed between the protective means and the elongate member.

11. A pre-connectorized fiber optic distribution cable having at least one access location for providing access to a plurality of preterminated and pre-connectorized optical fibers, comprising:
    a plurality of optical fibers disposed within at least one tube, at least a portion of the plurality of optical fibers being preterminated and withdrawn from the tube at the at least one access location;
    a multi-fiber pigtail comprising a multi-fiber connector optically connected to the preterminated optical fibers;
    a tube transition piece operable for transitioning the plurality of optical fibers out of the tube and the cable; and
    a protective shell for encapsulating the access location, wherein the protective shell remains on the cable during installation and until the at least one access location is needed for interconnecting a branch cable or drop cable.

12. The pre-connectorized distribution cable of claim 11, wherein the protective shell is a heat deformable material.

13. The pre-connectorized distribution cable of claim 11, wherein the protective shell is an over-molded encapsulating shell.

14. The pre-connectorized distribution cable of claim 11, wherein the cable, the at least one tube, the tube transition piece and the protective shell are sufficiently flexible to permit installation through buried conduits and over aerial installation sheave wheels and pulleys.

15. The pre-connectorized distribution cable of claim 11, wherein a predetermined useable length of the preterminated and pre-connectorized optical fibers ranges from about 10 to about 30 inches.

16. The pre-connectorized distribution cable of claim 11, further comprising at least one ripcord disposed underneath the protective shell operable for removing the protective shell following installation of the cable.

17. A method of forming a preterminated and pre-connectorized fiber optic distribution cable in the factory prior to installing the cable in a fiber optic communications network to provide a pre-connectorized mid-span access location, comprising:
    removing a predetermined length of a cable sheath to expose at least one buffer tube;
    cutting at least two access points along the length of the buffer tube;
    severing a plurality of optical fibers disposed within the buffer tube at a first downstream access point to produce a predetermined number of preterminated optical fibers;
    fishing the preterminated optical fibers out of an upstream access point to withdraw a useable length of the preterminated optical fibers;
    transitioning the useable length of the preterminated optical fibers out of the buffer tube and the cable via a buffer tube transition piece; and
    pre-connectorizing the preterminated optical fibers with a multi-fiber connector.

18. The method of claim 17, further comprising
    positioning and maintaining the preterminated and pre-connectorized optical fibers in an elongate member comprising a longitudinally extending optical fiber guide channel; and
    protecting and sealing the mid-span access location with a protective encapsulant.

19. The method of claim 18, wherein the protective encapsulant is a heat deformable material.

20. The method of claim 18, wherein the protective encapsulant is an over-molded shell.

* * * * *